United States Patent [19]

Suzuki

[11] Patent Number: 5,349,689
[45] Date of Patent: Sep. 20, 1994

[54] APPARATUS FOR MAINTAINING RESET ON MICROPROCESSOR UNTIL AFTER ELECTRICAL CHATTERING FROM CONNECTION OF REMOVABLE MEMORY CARTRIDGE HAS CEASED

[75] Inventor: Masahiro Suzuki, Tokyo, Japan

[73] Assignee: Oki Electric Industry Co., Ltd., Tokyo, Japan

[21] Appl. No.: 3,859

[22] Filed: Jan. 8, 1993

Related U.S. Application Data

[63] Continuation of Ser. No. 436,622, Nov. 15, 1989, abandoned.

[30] Foreign Application Priority Data

Nov. 21, 1988 [JP] Japan .................. 63-292480

[51] Int. Cl.$^5$ .................. G06F 9/04; G06F 11/30
[52] U.S. Cl. .................. 395/800; 273/435; 364/DIG. 2; 364/953; 364/953.4; 364/971
[58] Field of Search .................. 273/435; 395/800

[56] References Cited

U.S. PATENT DOCUMENTS

| | | | |
|---|---|---|---|
| 4,716,523 | 12/1987 | Barrus, Jr. et al. | 395/425 |
| 4,826,332 | 5/1990 | Ukai et al. | 365/52 |
| 4,835,737 | 5/1990 | Herrig et al. | 395/325 |
| 4,956,766 | 9/1990 | Dhopeshwarkar et al. | 395/575 |
| 4,999,787 | 3/1991 | McNally et al. | 395/325 |
| 5,095,430 | 3/1992 | Bonito et al. | 364/410 |
| 5,137,379 | 8/1992 | Ukai et al. | 400/121 |

OTHER PUBLICATIONS

Uffenbeck, John, "Microcomputers and Microprocessors," 1985, Prentice-Hall Inc, pp. 141-142.

Primary Examiner—Parshotam S. Lall
Assistant Examiner—Richard Lee Ellis
Attorney, Agent, or Firm—Spencer, Frank & Schneider

[57] ABSTRACT

An electric circuit device includes a connector for permitting removal and mounting of a cartridge with a circuit built therein, and a processor for performing operations and processing using the circuit built in the cartridge. A first reset circuit is provided in the electric circuit device for supplying the processor with a first reset signal, and for producing the first reset signal when resetting is commanded by manual input or when a power supply to the electric circuit device is turned on. The electric circuit device also includes an arrangement for producing a connection detection signal indicating whether or not a cartridge is mounted to the connector, and a second reset circuit for receiving the connection detection signal via the connector. When the connection detection signal is not received by the second reset circuit, it outputs a second reset signal. When the connection detection signal begins to be received, the second reset circuit terminates the second reset signal a predetermined time after tile beginning of the reception of the connection detection signal. The processor is reset when it receives either the first reset signal or the second reset signal.

7 Claims, 5 Drawing Sheets

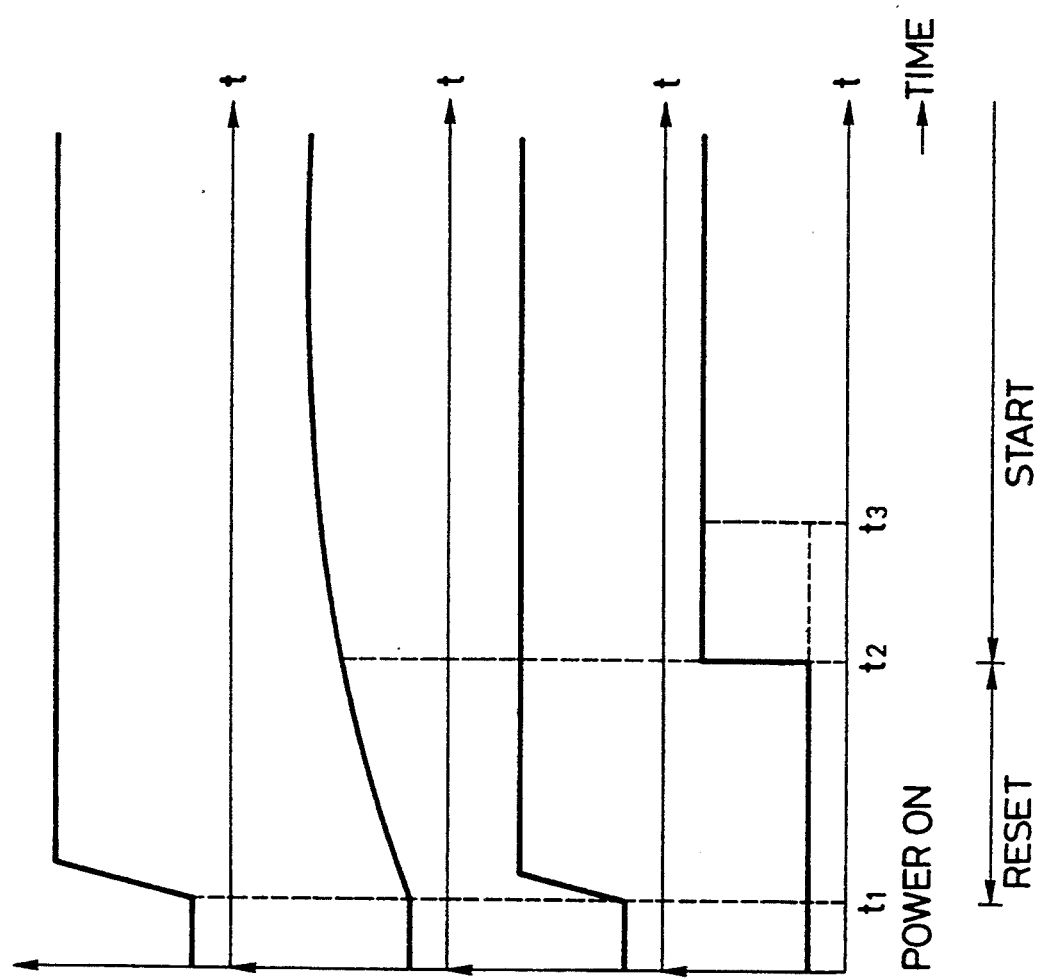

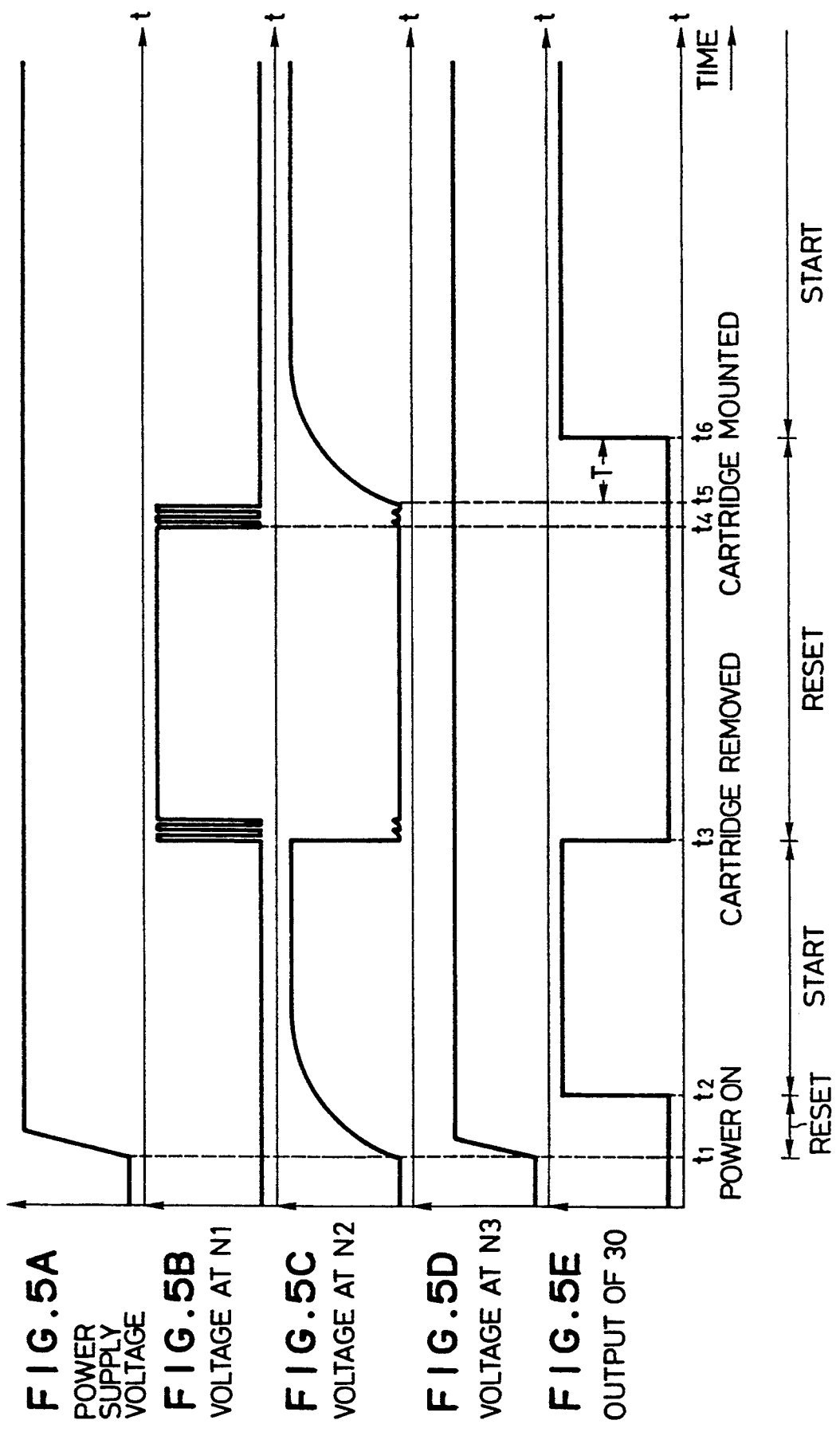

APPARATUS FOR MAINTAINING RESET ON MICROPROCESSOR UNTIL AFTER ELECTRICAL CHATTERING FROM CONNECTION OF REMOVABLE MEMORY CARTRIDGE HAS CEASED

This application is a continuation of application Ser. No. 07/436,622, filed Nov. 15, 1989 now abandoned.

BACKGROUND OF THE INVENTION

The present invention relates to an electric circuit device which has a processor operating in accordance with a program and which is provided with an improved cartridge connection circuit for removably mounting a cartridge in which an external circuit is built.

In word processors, printers, personal computers and like information processing devices, a processor provided therein operates in accordance with a program which is stored in a memory built in the device main unit (which may also called an electric circuit), or the like.

However, it often happens that a cartridge with an external memory is used for expanding the memory space. In certain occasions, optional programs are stored in the cartridge's external memory. In these cases, the cartridges are removaly mounted to a connector provided on the device.

FIG. 1 shows a block diagram of a prior art cartridge connection circuit.

In the figure, a program cartridge 1 is connected to a main unit 2 via a connector 8. A read-only memory (ROM) 4 comprising several chips is built in or mounted on the program cartridge 1, and a decoder 5 is also provided to select one of these chips.

The main unit 2 is provided with a processor (CPU) 6 which controls various circuits, not shown, and operates in accordance with the programs stored in the program cartridge 1. By means of address signals 11, the processor 6 reads certain data 12 from the read-only memory 4 mounted on the program cartridge 1, and operates in accordance with the sequence and algorithm indicated by the data.

A decoder 7 is provided to control the access to other memories built in or mounted on the main unit 2. Moreover, a reset circuit 8 is provided to control resetting when the power supply to the device is turned on, or an operator instructs resetting by manipulation of a key.

The above circuits operates as follows.

First, when a program cartridge 1 is connected to the connector 3, a power supply line 20 and a ground line 20' are connected between the main unit 2 and the program cartridge 1. In this state, If the processor 6 outputs address signals 11, they are decoded by the decoder 7. As a result, the decoder 7 produces a select signal 13 to operate the decoder 5 mounted on the program cartridge 1.

When the decoder 5 starts its operation, it decodes the address signals 11 inputted from the main unit 2, and outputs a chip select signal for selecting one of the chips forming the read-only memory 4. One of the chips of the read-only memory 4 is thereby selected, and the address signal from the processor 6 is Inputted there.

The processor 6 supplies the selected chip with an output enable signal 15 for the reading of data. As a result, the selected chip of tile read-only memory 4 outputs data and permits the processor 6 to read the data.

When the power supply to tile main unit is turned on, the reset circuit 8 supplies the processor 6 with a reset signal 16 for a predetermined time. The reset signal 16 is terminated after a predetermined time, by a timer built In the reset circuit 8. Responsive to the termination of the reset signal 16, the processor starts the data reading operation and the like as described above.

Thus, by providing program cartridges 1 with read-only memories 4 storing different programs, different processings can be achieved by changing the program cartridge 1.

However, when power to the device shown in FIG. 1 Is turned on without a cartridge 1 mounted on the connector 3, because the processor 6 does not have a program to read, the processor 6 may behave erratically (i.e., the processor 6 operates out of control of a program). To avoid the erratic behavior when the program cartridge 1 is exchanged, it was necessary to turn off tile power during the exchange. This was troublesome.

FIG. 2 shows a block diagram of another prior art electric circuit device designed to solve the above problem.

In this device as well, a program cartridge 1 is connected to the main unit 2 via connector 3. A read-only memory 4, a decoder 5, a processor 6, a decoder 7, and a reset circuit 8 have a construction similar to those shown in FIG. 1.

In this device, a read-only memory 9 and a tri-state buffer 10 are added. A pull-up resistor R0 is connected to the input of the tri-state buffer 10, so that when a program cartridge 1 is not mounted, the input of the tri-state buffer 10 goes High. When a program cartridge 1 is mounted, the input of the tri-state buffer 10 goes Low due to input of a connection detection signal 21 from the program cartridge 1.

In FIG. 2, the processor 6 causes the decoder 7 to produce a chip select signal 17 for controlling the reading of the read-only memory 9. It simultaneously outputs an output enable signal 15 and supplies it to the read-only memory 9 to read data 12 from the read-only memory 9. The data 12 includes a program for judging the presence or absence of the connection detection signal 21 that is inputted to the tri-state buffer 10. In accordance with the program, the processor 6 makes a control signal 18 supplied from the decoder 7 to the tri-state buffer 10 low, to receive the connection detection signal 21 that is inputted to the tri-state buffer 10, via the data line 19. The processor 6 reads the connection detection signal 21 and judges whether or not a program cartridge 1 is mounted depending on whether the connection detection signal 21 is High or Low.

If no program cartridge 1 is mounted, the processor 6 receives data from the read-only memory 9 for terminating the operation in a predefined sequence. In tills way, the processor 6 is prevented from behaving erratically even if no program cartridge 1 is mounted.

When a program cartridge 1 is mounted, in the same way as described with reference to FIG. 1, a select signal 13 is supplied from the decoder 7 to the decoder 5, and a program is read from tile read-only memory 4.

As has been described, with the device of FIG. 2, a connection detection signal 21 is received from the program cartridge, so that when the program cartridge i is not mounted this is detected by the processor, and its erratic behavior is prevented.

However, with the device shown in FIG. 2, the read-only memory 9 is included in the logical address space of the processor 6. That is, part of the memory space of the processor 6 is occupied by the read-only memory 9, and the memory space formed of the read-only memory 4 of the program cartridge 1 is reduced. As a result, freedom in the design of the control program is reduced.

SUMMARY OF THE INVENTION

The present invention has been made in view of the above, and its object is to provide an electric circuit device having a processor which is prevented from behaving erratically when a cartridge with an external circuit is not mounted. The power supply need not be disconnected even at the time of exchange of the cartridge. Furthermore information on the removal or mounting of the program cartridge can be transferred to the device without the aid of a software.

The electric circuit device according to the invention includes a connector for permitting removable mounting of a cartridge with a circuit built therein, a processor for performing operations and processing using the circuit built in the cartridge, and a first reset circuit for supplying the processor with a first reset signal. The first reset circuit produces the first reset signal when resetting is commanded by manual input or when a power supply of the electric circuit device is turned on. The electric circuit device also includes an arrangement for producing a connection detection signal indicating whether or not a cartridge is mounted to the connector, a second reset circuit for receiving the cartridge connection detection signal via the connector, and an arrangement for applying a reset input to the processor when the first reset signal or the second reset signal is produced. When the connection detection signal is not inputted, the second reset circuit outputs a second reset signal, and when the connection detection signal begins to be inputted, the second reset circuit terminates the second reset signal a predetermined time after the beginning of the reception of the connection detection signal.

The second reset circuit supplies the processor with a second reset signal when the cartridge connection detection signal is not inputted. The processor is therefore prevented from behaving erratically even when the cartridge connection detection signal is not inputted. Moreover, when the cartridge is once removed from the connector and thereafter mounted again, the connection detection signal which is inputted then is terminated a predetermined time after. Accordingly, erroneous operation of the processor due to chattering which can occur when a cartridge is removed and mounted while tile power is on is avoided. Furthermore, since the processor executes the resetting operation when either one or both of the first reset signal outputted from the second reset circuit and the reset signal outputted from the second reset circuit are inputted, the resetting can be made without fail.

BRIEF DESCRIPTION OF THE DRAWINGS

FIG. 4A, 4B, 4C, and FIG. 4D are time charts showing the operation of the circuit of the invention when the power is turned on with the cartridge being kept mounted.

FIG. 5A, 5B, 5C, 5D, and FIG. 5E are time charts showing the operation of the circuit of the invention when the cartridge is removed and mounted with the power being kept on.

DETAILED DESCRIPTION OF THE EMBODIMENTS

The invention will now be described in detail in connection with an illustrated embodiment.

Figure 3:
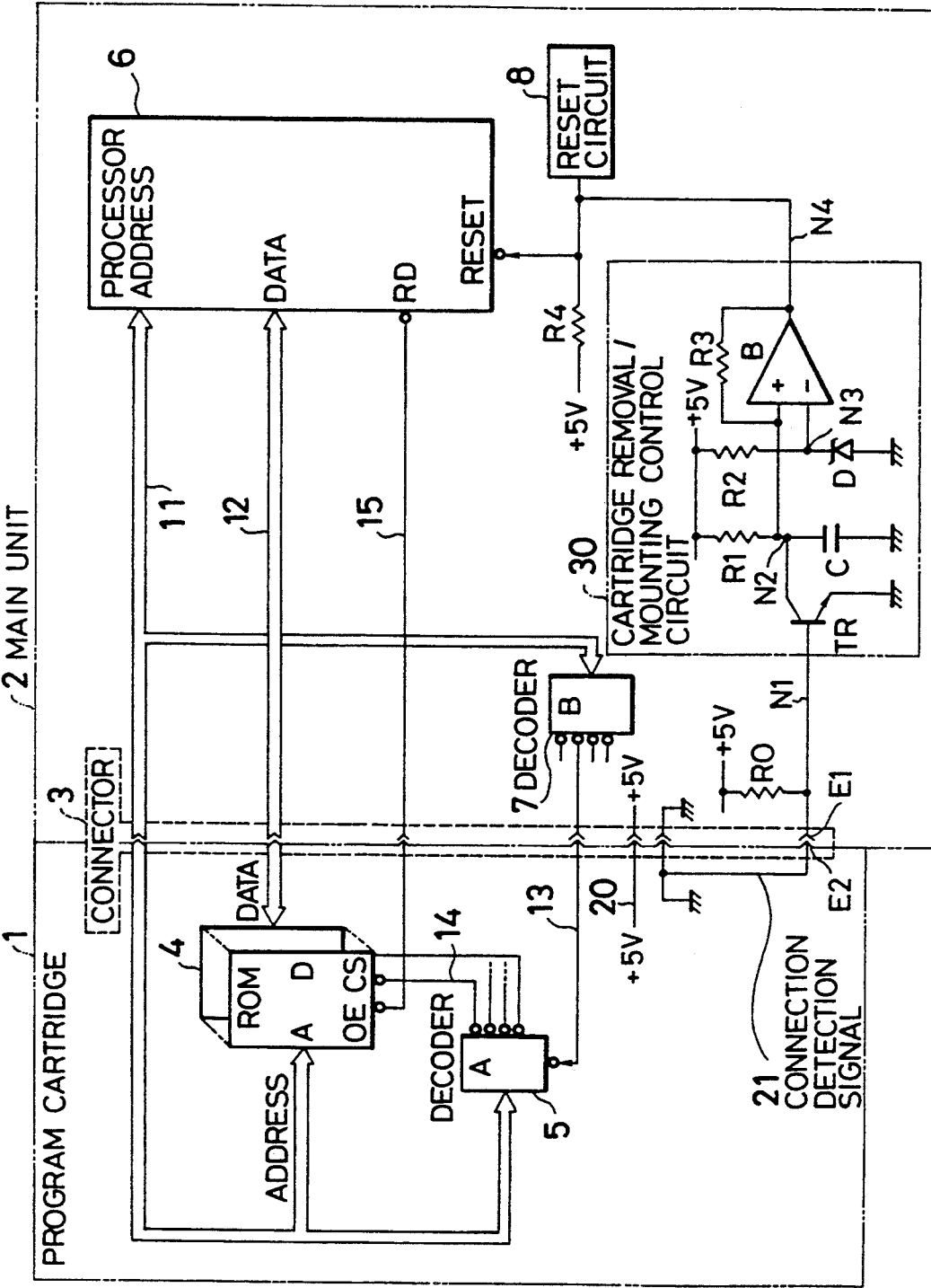
FIG. 3 is a block diagram of an embodiment of an electric circuit device according to the invention.

FIG. 3 is a block diagram of an embodiment of an electric circuit device according to the invention.

Figure 2:
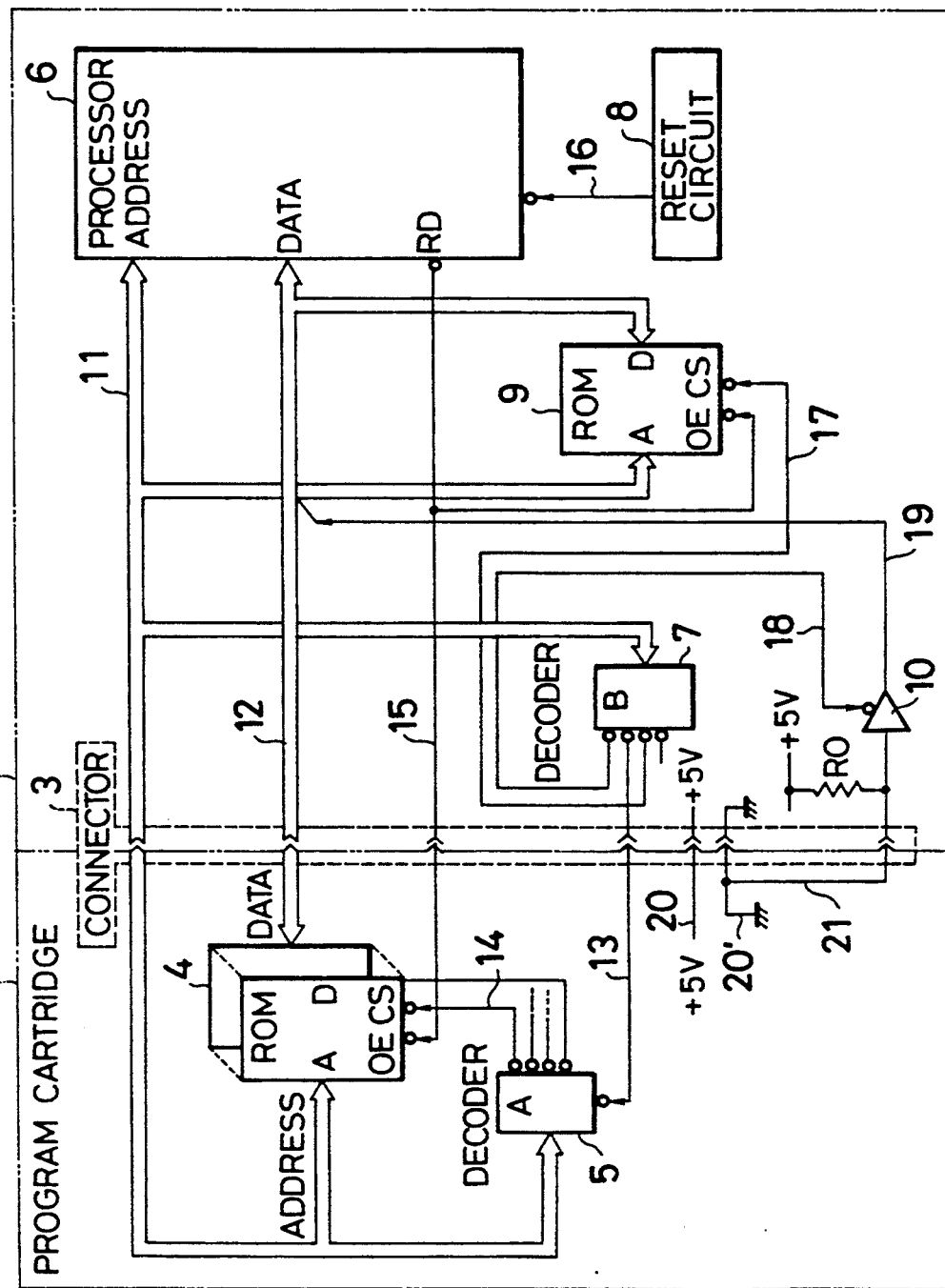
FIG. 2 is a block diagram of another prior art electric circuit device.

In the figure, a program cartridge 1 is removably mounted to a main unit 2 via a connector 3. Built in or mounted on the program cartridge 1 are a read-only memory 4 and a decoder 5. Provided in the main unit is a first reset circuit 8 and a decoder 7. The above construction is identical to that of the circuit described with reference to FIG. 2. Also, similar to that described with reference to FIG. 2, a connection detection signal 21 is produced by a means for detecting the connection or mounting of the cartridge. Such means comprises a connection detection node N1, an electrode E1 that is connected to the connection detection node N1 and is also connected to an electrode E2 of a cartridge I when the cartridge 1 is joined to the connector. The connection detection node N1 is also connected to tile +5 V power supply terminal through a pull-up resistor R0, while the above-mentioned electrode E2 of the cartridge i is grounded. When the cartridge 1 is mounted, the connection detection node N1 is at the ground potential, while when the cartridge is not mounted, the connection detection node N1 is pulled up to the potential of the +5 V power supply terminal. This difference is detected by a transistor TR which will later be described.

According to the invention, a second reset circuit 30 is additionally provided In the main unit. This circuit comprises the transistor TR that is mentioned above. The base of transistor TR is connected to the node N1 and its emitter is grounded to form a switching circuit. The collector of the transistor TR is connected to a node N2 joining one end of a resistor R1 and one electrode of a capacitor C. The other electrode of the capacitor C is grounded. The other end of the resistor R1 is connected to the +5 V power supply terminal.

The node N2 is connected to the non-Inverting input terminal of a comparator B whose output side is of an open-collector configuration. The inverting Input terminal of this comparator B is connected to a node N3 joining one end of a resistor R2 and a cathode of the Zener diode D. As illustrated, the resistor R2 and the Zener diode D are connected in series between the +5 V power supply voltage and the ground. As a result, the inverting input terminal of the comparator B is supplied with a constant reference voltage regulated by the Zener diode D. Thus, the series connection of the resistor R2 and the Zener diode D form a means for producing a reference voltage of a predetermined constant value.

A resistor R3 is connected across the non-inverting input terminal and the output terminal of the comparator B. This resistor R3 is provided so that the comparator B will have hysteresis characteristics. The output of the comparator B, which is connected to a node N4, is conveyed together with the output of the first reset circuit 8, to the reset terminal of the processor 6. The reset terminal of the processor 6 is connected through a pull-up resistor R4 to the +5 V power supply terminal.

When either of the first reset circuit 8 and the second reset circuit 30 produces a reset signal, i.e., when the output of tile first reset circuit 8 or the output of the second reset circuit 30 is Low, the reset terminal of the processor 6 goes Low, and the processor 6 executes the resetting operation. When the reset signal is produced from neither circuit, the reset terminal of the processor 6 is kept High by virtue of the pull-up resistor R4. In this way, the reset circuits 8 and 30 are connected to the reset terminal of the processor 6 in a wired-OR configuration, and for this purpose, the comparator B has the open-collector configuration.

Figure 1:
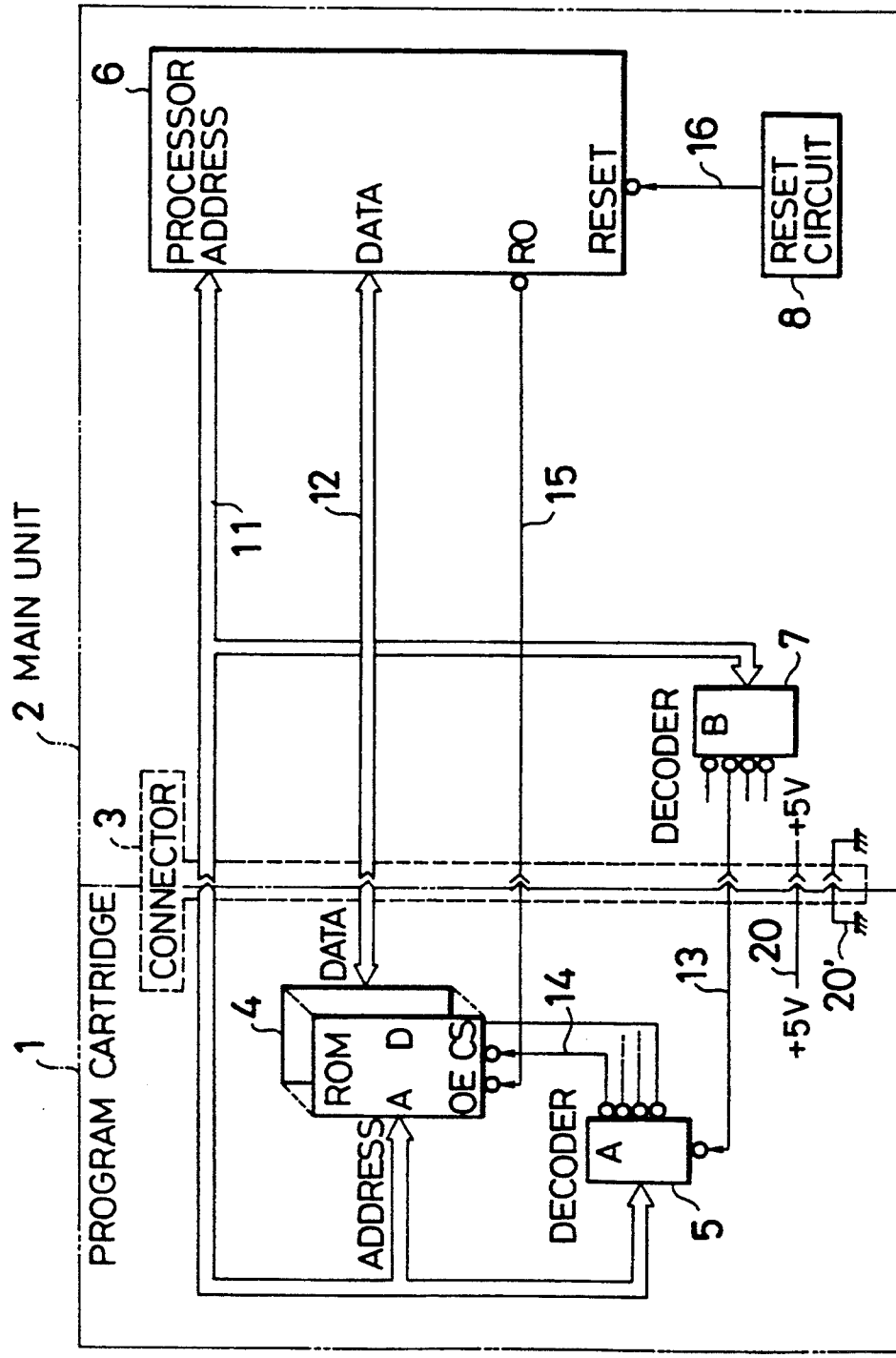
FIG. 1 is a block diagram of a prior art electric circuit device.

The above circuit operates as follows:

First, when the processor 6 starts up, predetermined data are read from the read-only memory 4 of the program cartridge 1. This operation is identical to that described with reference to FIG. 1. That Is, the processor 6 outputs address signals 11, and the decoder 7 in the main unit supplies a select signal 13 to the decoder 5 on the program cartridge 1. Responsive to this, the decoder 5 on the program cartridge 1 decodes the address signals 11 inputted from the processor 6, and outputs a chip select signal 14 for selecting one of the chips of the read-only memory 4. As a result, tile address signal 11 is supplied from the processor 6 to the selected chip, and an output enable signal 15 is also inputted to this chip. Then, data 12 is read out and supplied to the processor 6. The processor 6 thus reads the program stored In the read-only memory 4 on the program cartridge 1 and performs predetermined operations.

The operation of tile second reset circuit 30 added in the device of the invention will now be described with reference to FIG. 4A to FIG. 4D, which show the voltages at various nodes when the power supply is turned on after the cartridge 1 is mounted.

As illustrated in FIG. 4A to FIG. 4D, when the power is turned on at time t1 when the cartridge is kept mounted, the power supply voltage rises first, as shown in FIG. 4A. At the same time, the voltage at the inverting input terminal of the comparator B as shown in FIG. 3, i.e., the voltage at node N3, rises (FIG. 4C). While the cartridge 1 is mounted, the connection detection signal 21 at the node N1 is kept Low, so the transistor TR is kept off. As a result, the capacitor C is charged from the +5 V power supply voltage through the resistor R1, and depending on the time constant of the capacitor C and the resistor R1, the voltage across the capacitor C, i.e., the voltage at node N2, rises (FIG. 4B). As a result, at time t2, which is a predetermined time after the power on at t1, the voltage at node N2 in FIG. 3 exceeds the voltage at node N3, and the output of the comparator B changes from Low to High (FIG. 4D).

In FIG. 4D, if the reset signal outputted from the first reset circuit 8 shown in FIG. 3 has risen from Low to High before time t2, the resetting of the processor 6 is terminated at time t2 when the reset signal t2 outputted from the second reset circuit 30 goes from Low to High. If the reset signal outputted from the first reset circuit 8 is terminated after time t2, e.g., at a time t3, the resetting of the processor 6 is terminated at t3, as Indicated by broken lines in the figure. As a result, after the reset input is terminated, the processor 6 accesses the read-only memory 4 on the program cartridge 1 to start predetermined operations.

Now the case in which the program cartridge 1 is removed, and is thereafter mounted will be described.

FIG. 5A through FIG. 5E are time charts showing the operations when the cartridge is removed and mounted while the power is kept on.

In FIG. 5A through FIG. 5E, the process from t1 to t2 was explained with reference to FIG. 4A to FIG. 4D. Moreover, if the cartridge 1 is not mounted, the voltage at node N2 does not rise, and the voltage at the output of the second reset circuit 30 is kept Low, and the reset state is continued. When the power is turned off, the circuit returns to the state before time t1.

Assume that the cartridge is removed at time t3 while the power is kept on. In this case, the connection detection signal 21 in FIG. 3 is not inputted, and the Voltage at node N1, i.e., on the base of the transistor TR, goes High by virtue of the pull-up resistor R0. In this case, chattering takes place at the moment of the removal of the cartridge, and the voltage at node N1 oscillates as it goes High, as shown In FIG. 5B.

When the voltage at node N1 goes High, the transistor TR is turned on, and tile capacitor C is instantly discharged. As a result, the voltage at node N2, i.e., on the collector of the transistor TR instantly goes Low as shown in FIG. 5C.

Since the voltage at node N3, i.e., the Zener voltage inputted to the inverting input terminal of the comparator B, is constant, the output of the comparator B goes Low at time t3. Thus, a reset signal is produced from the second reset circuit 30. The processor 6 performs the resetting operation. As a result, the processor 6 is prevented from behaving erratically while the cartridge 1 is removed.

Assume next that the program cartridge 1 is again mounted at time t4 shown in FIG. 5B. In this case, chattering takes place from time t4 to time t5. However, at time t4, the voltage at node N1, i.e., the base of the transistor TR, goes Low by virtue of the connection detection signal 21, and the transistor TR is turned off. The capacitor C is therefore charged through the resistor R1, and the voltage at node N2 starts rising. Upon expiration of time T shown in FIG. 5E, the voltage on the capacitor C, i.e., the voltage at N2, exceeds the voltage at N3, and at time t6, the output voltage N4 of the comparator B goes High.

Then, the first reset circuit shown In FIG. 3 is not producing any reset signal, and at time t6 the resetting of the processor 6 is terminated, and tile processor 6 starts accessing the read-only memory 4 on the program cartridge 1.

The reason for the provision of the timer function, wherein the resetting is terminated a predetermined time after the commencement of the reception of the connection detection signal 21 at the second reset circuit 30, is to avoid the chattering of the connection detection signal 21 at the moment of mounting of the cartridge 1. It is therefore preferable that the delay time be set sufficiently longer than the duration of the chattering, which is about a few tens to a few hundreds of milliseconds, e.g., 500 milliseconds or longer. As a result, no troubles occur in the operation of the processor even if the cartridge is removed and mounted while the power is kept on.

The present invention is not limited to the embodiment described above.

The second reset circuit may be of any other equivalent configuration, e.g., one having a digital delay circuit. The output of the second reset circuit may be inputted to the reset terminal of the processor 6 through known a gate circuit or the like.

In the embodiment described above, the cartridge with an external circuit was a program cartridge 1. But tile external circuit may be other than a read-only memory storing a program. It may alternatively be some other circuit, such as a battery-backed-up random access memory, or a random access memory for expanding memory space, or an input/output control circuit.

The electric circuit device according to the invention described above performs resetting on tile basis of reset signals produced from the second reset circuit and a first reset circuit, so even when power is turned on while the cartridge is not mounted, the reset state is maintained, and erratic behavior of the processor is prevented. Moreover, if the cartridge is exchanged while the power is kept on, the second reset circuit operates such that the reset signal is terminated a predetermined time after the commencement of reception of the connection detection signal, so no trouble is caused in the operation of the device, and manipulation of the device is facilitated. Furthermore, no software is used for the processing of the connection detection signal, so the memory space is not reduced, and the freedom of design of the software is improved.

The invention is particularly advantageous where information necessary for the operation of the device is stored in an external circuit, for instance where an emulation program cartridge defining operation commands for a printer, a dictionary ROM (read-only memory) card for a word processor or an electronic pocket-notebook are connected to a device via a connector.

What is claimed is:

1. An electric circuit device, comprising:
   connector means for permitting removable mounting of a cartridge with a circuit built therein;
   processor means for performing operations and processing using said circuit built in said cartridge;
   a first reset circuit means for supplying said processing means with a first reset signal, said first reset circuit means producing said first reset signal when resetting is commanded by manual input or when a power supply for the electric circuit device is turned on;
   connection detection means for producing a connection detection signal which is in a first state when the cartridge is mounted to the connector means and which is in a second state when the cartridge is not mounted to the connector means;
   second reset circuit means for receiving said connection detection signal via the connector means and for producing a second reset signal when said connection detection signal is in said second state, said second reset circuit means terminating said second reset signal a predetermined time after said first state of said connection detection signal begins, said predetermined time being longer than the duration of chattering of the connection detection signal which may occur when the cartridge is being mounted; and
   means for applying a reset input to said processor means when said first reset signal or said second reset signal is received,
   wherein said second reset circuit means includes
      a first resistor and a capacitor connected in series between the power supply and ground,
      switch circuit means for discharging the capacitor when said connection detection signal is in said second state and permitting charging of the capacitor from the power supply through said first resistor when said connection detection signal is in said first state,
      reference voltage means for producing a reference voltage having a predetermined constant value, and
      comparator means for comparing the voltage on the capacitor and the reference voltage and producing said second reset signal when the former is lower than the latter.

2. The device of claim 1 wherein said switch circuit means comprises a transistor having its collector connected to the junction between said capacitor and said first resistor and having its emitter grounded and having its base connected to receive the connection detection signal.

3. The device of claim 2, wherein said connection detection means comprises an electrode that is connected to an electrode of the cartridge when the cartridge is mounted to the connector means, said electrode of the cartridge being grounded, and means for connecting said base of said transistor to a terminal of the power supply.

4. The device of claim 3, wherein said means for connecting said base of said transistor to a terminal of the power supply comprises a resistor.

5. The device of claim 2, wherein said circuit of the cartridge comprises a memory storing a program, wherein said connector means comprises electrodes for transferring addresses and data between the processing means and the memory, and wherein said processor means reads and executes the program stored in said memory when said cartridge is mounted to the connector means.

6. The device of claim 1, wherein the reference voltage has an absolute value that is greater than zero.

7. The device of claim 1, wherein the reference voltage means comprises a Zener diode.

* * * * *